UNITED STATES PATENT OFFICE.

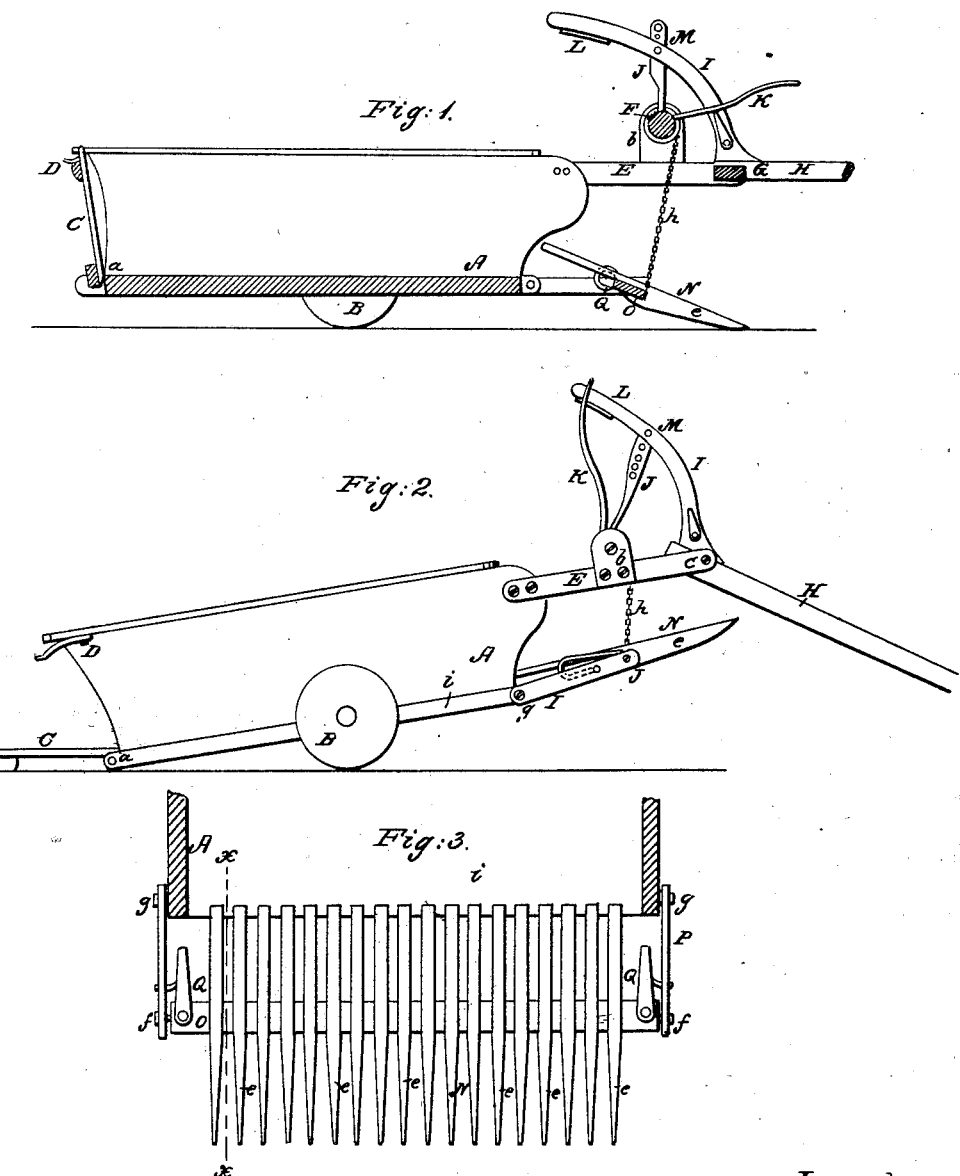

ERASTUS HOLT, OF WHEATON, ILLINOIS.

IMPROVEMENT IN SELF-LOADING HAY-CARTS.

Specification forming part of Letters Patent No. 45,715, dated January 3, 1865.

*To all whom it may concern:*

Be it known that I, ERASTUS HOLT, of Wheaton, in the county of Du Page and State of Illinois, have invented a new and Improved Self-Loading Cart; and I do hereby declare that the following is a full, clear, and exact description thereof, which will enable others skilled in the art to make and use the same, reference being had to the accompanying drawings, forming a part of this specification, in which—

Figure 1 is a side sectional view of my invention, taken in the line $x\ x$, Fig. 3; Fig. 2, a side view of the same; Fig. 3, a plan or top view of the rake and a portion of the front end of the cart-body.

Similar letters of reference indicate like parts.

This invention relates to a new and improved self-loading attachment to be applied to carts, so that the same may be loaded with hay or grain as they are drawn along in the field, thereby avoiding the laborious manipulation of loading with a fork, as now practiced.

A represents the body of a cart, which is mounted on low wheels B B, and is provided with a tail-board, C, which works on pivots or journals $a$ at its lower end, and is secured in a closed state against the back end of the body A by means of catches or fastenings D, constructed in any proper way.

To the front end of the body A, at each side, there is attached an arm, E, on which the bearings $b\ b$ of a shaft, F, are secured, and between the front parts of the arms E E there is secured, by pivots or journals $c$, a bar, G, to the center of which the draft-pole H is attached.

To the rear end of the draft-pole there is secured a curved arm, I, which extends upward and backward toward the body A, as shown clearly in Figs. 1 and 2, and said arm has a metal plate secured to one side over a notch or recess, so as to confine a bar, J, against the arm I, while permitting the latter to slide up or down; or a mortise may be made in the arm for the bar J to pass through, the lower end of J being bent or curved in the form of a clip, so as to fit loosely around the shaft F in a groove made therein.

The shaft F has a lever, K, attached to it, and this lever extends up by the side of the arm I, the latter having a notched plate, L, attached to it to receive the lever K when necessary.

The bar J is perforated with a series of holes through any one of which and the arm I a pin, M, passes.

N represents a rake, which is composed of a series of teeth, $e$, secured transversely to a bar, O, the ends of which are secured by pivots or journals $f$ between arms P P, which are attached at their rear ends by pivots $g$ to each side of the front of the body A.

At each end of the rake-bar O there is a spring, Q. These springs are bent or curved, and their ends opposite to those which are attached to the bar O are fitted in the arms P.

The rake N is connected at each end, by cords or chains $h\ h$, to the shaft F.

The rear ends of the teeth $e$ project a trifle over the front edge of the bottom $i$ of the body A of the cart, and as the device is drawn along the front ends of the rake-teeth run in contact with the ground, the lever K being released from the notched plate L to admit of that result. The springs Q Q cause the front ends of the teeth $e$ to be kept properly to their work, said springs admitting of the teeth yielding or giving to conform to irregularities of surface over which they may pass.

The machine is drawn along, so as to rake the hay or grain up from windrows, and, if necessary, a device may be employed—such, for instance, as a reel—to throw the grass or grain back into the body of the cart. In cases where the crop is heavy the grass or grain may be raked directly up from the swath; but I think it would in a majority of cases be better to first rake it up into windrows.

When the cart-body is full the rake N is raised by drawing back the upper end of the lever I and fitting it in the notched plate L, the cords or chains $h\ h$ winding upon the shaft F as the latter is turned. With the rake N thus elevated the cart may be drawn to the barn or stack, and in order to dump or discharge the load the cart is tilted or inclined by elevating the bar J and placing the pin M through one of the upper holes in said bar, as shown in Fig. 2. The load can then be readily shoved out from the body A.

Having thus described my invention, I claim as new and desire to secure by Letters Patent—

1. The rake N, having its bar O pivoted between arms P P, which are attached by pivots to the sides of the body A of the cart, in combination with the shaft F, cords or chains $h\,h$, lever K, and the arm I, or its equivalent, all arranged substantially as and for the purpose herein set forth.

2. The bar G, pivoted between the arms E E at the sides of the front end of the cart-body, in combination with the arm I at the rear of the draft-pole H, and the bar J, attached to shaft F, all being arranged to operate in the manner substantially as and for the purpose specified.

ERASTUS HOLT.

Witnesses:
PHILANDER PARMELEE,
H. H. FULLER.